June 30, 1964  R. HOLT  3,138,877
HOLE CENTER LOCATING AND MARKING TOOL
Filed Nov. 1, 1962

INVENTOR.
RALPH HOLT
BY John R. Walker, III
Attorney

United States Patent Office

3,138,877
Patented June 30, 1964

3,138,877
HOLE CENTER LOCATING AND MARKING TOOL
Ralph Holt, 3153 Hull, Memphis, Tenn., assignor of one-half to James L. Halligan, Memphis, Tenn.
Filed Nov. 1, 1962, Ser. No. 234,663
6 Claims. (Cl. 33—191)

This invention relates to center punches and the like. More specifically, it is a tool whereby a circular hole in a first piece of material can be accurately located and duplicated in a second piece of material. Still more specifically, the invention provides a tool to facilitate the accurate center marking of a hole to be duplicated prior to the same being drilled.

Heretofore, the principal mechanical means of duplicating a hole or the means of finding and marking the center for a second hole from an existing first hole has been by the the use of a tracer punch set. These sets are familiar to those skilled in the art, and when used, they accurately find the center of a hole and mark it. Tracer punch sets are particularly suitable in machine work requiring a high degree of exactness; however, because of the time and skill required to use it, and the relatively high cost of the set, it is impractical for use in many places, as, for example, in small machine shops and garages.

The most frequently employed way of locating and marking a hole to be duplicated, and the one used in most instances, is that of estimating where the center is. Estimating and drilling approximately where the hole center should be often results in holes that are not in register, misfitted pieces, and wasted material.

The present invention does much to overcome the above mentioned difficulties and has as one of its principal objects to provide a relatively small and compact tool to effectively locate and mark the center for a hole.

A further object is to provide a hole center locating and marking tool having a self-centering feature and as such can be easily and speedily used.

A further object of the present invention is to provide a tool that is equally effective for locating and marking the centers for various hole sizes.

A further object is to provide a hole center locating and marking tool of relatively simple construction and as such is comparatively economical to make and sell.

A further object is to provide a hole center locating and marking tool that is suitably adapted for use in a limited work space or in hard-to-reach places.

A further object is to provide a hole center locating and marking tool having a spring impelled marking plunger.

A further object is to provide a hole center locating and marking tool whereby the marking force of the plunger may be controlled and as such, when marking the center for a hole, the plunger can be optionally spring-impelled for light marking or struck with a hammer for more forceful, heavier marking.

A further object is generally to improve the design and construction of tools for locating and marking the centers for holes and the like.

The means by which the foregoing and other objects of the present invention are accomplished and the manner of their accomplishment will be readily understood from the following specification upon reference to the accompanying drawings, in which.

Figure 1:
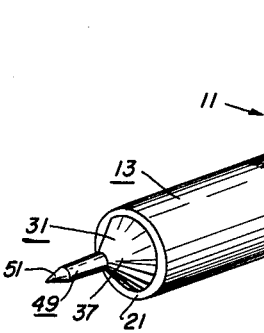
FIG. 1 is a perspective view of the tool of the present invention.

Referring now to the drawings in which the various parts are indicated by numerals, tool 11 of the present invention includes a tubular body 13, the walls thereof being defined by an outside cylindrical surface 15 and an inside cylindrical surface 17. For purposes of clarity, the end of tool 11 to the left, as viewed in FIG. 1, will hereinafter be referred to as the forward end, and the end of the tool to the right in this figure will be designated the rearward end. Thus, the forward end of tubular body 13 is provided with an inwardly projecting flanged portion 19 disposed perpendicular to the longitudinal axis of tubular body 13 and defined by a front face 21, a cylindrical inner surface 23, and a rear face 25. The rearward end of tubular body 13 is terminated by surface 27 and is provided with internal threads 29 beginning at surface 27 and extending forwardly a short distance.

Figure 3:
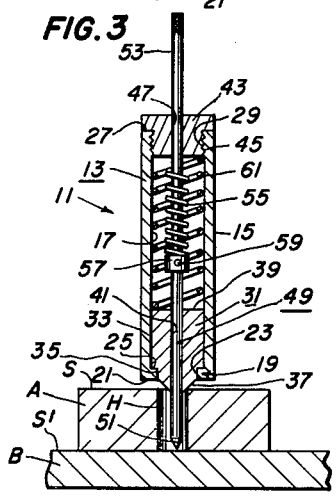
FIG. 3 is a longitudinal sectionalized view of the tool and includes a fragmentary part of the workpieces taken as on the line III—III of FIG. 2, and also illustrating the device in an initial operating position with the tool disposed off-center in the hole and the centrally disposed marking plunger extended.

A guide member 31 is slidably positioned in tubular body 13 adjacent flanged portion 19. Guide member 31 includes and is defined by a first cylindrical surface 33, a respectively smaller second cylindrical surface 35, an annular surface 34 perpendicular to and interconnecting first and second surfaces 33, 35, respectively, a forwardly disposed conical end 37, a rearwardly disposed surface 39, and is also provided with a bore 41 extending centrally therethrough. Conical end 37 is preferably formed on an angle 45 degrees from a center line through the axis of guide member 31. Referring now to FIG. 3, the intersection of conical end 37 with cylindrical surface 35 should be substantially flush with the front face 21 of tubular member 13 when guide member 31 is in the forwardmost position, or when surface 34 of guide member 31 abuttingly engages rear face 25 of tubular body 13.

Body 13 additionally includes a cap-like end piece 43 having a reduced portion at the forward end thereof which is provided with external threads 45 and adapted to threadedly engage internal threads 29 of tubular body 13. End piece 43 is also provided with a centrally disposed bore 47 extending therethrough and corresponding in size and in alignment with bore 41 in guide member 31.

A rod-like plunger 49 is slidably fitted through bores 41 and 47 and extends respectively through guide member 31 and end piece 43. At the forward end of plunger 49 is point 51, preferably conical in shape and the metal thereof heat-treated and hardened to provide suitable marking characteristics. Point 51 is located on the longitudinal center line of the tool 11 and in alignment with the axis of conical end 37. In other words, the heretofore described parts are concentric with respect to point 51. The distal portion 53 of plunger 49 disposed rearwardly of end piece 43 provides a suitable finger grip means whereby plunger 49 can be retracted outwardly from tubular body 13. Distal portion 53 is also adapted to be struck on the end with a hammer to provide an optional means for actuating plunger 49. As illustrated in FIG. 1, the cylindrical outer surfaces of tubular body 13, end piece 43, and distal portion 53 of plunger 49 are preferably knurled thereby to roughen and provide a gripping surface for the fingers of the user.

The actuating means for plunger 49 preferably comprises a compression spring 55 convolutely carried on plunger 49 forwardly disposed of and adjacent end piece 43. A collar 57 is provided on plunger 49 whereby spring 55 abuttingly urges and impells plunger 49 forward. Collar 57 is preferably adjustable, as by adjustment screw 59, and is positioned along plunger 49 at such a point that will permit an appreciable amount of free travel; that is, there should be a short distance between the rearward end of spring 55 and end piece 43 when plunger 49 is extended.

A compression spring 61 is longitudinally disposed in tubular body 13 interposedly between guide member 31 and end piece 43 and is adapted to firmly urge and extend guide member 31 to a forwardly disposed position, as shown in FIG. 3.

Figure 2:
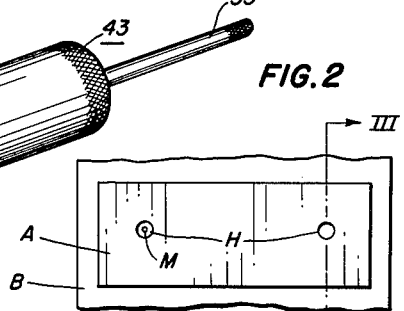
FIG. 2 is a plan view of a first and a second piece of material placed together to illustrate the function of the tool.

The primary use of tool 11 and the use illustrated in the drawings is that of center marking or center punching material for a hole to be duplicated. A first and a second workpiece of material, designated A and B respectively, are shown in FIG. 2 to illustrate a typical hole center marking step prior to the drilling of a hole and also to illustrate the function of tool 11. Workpiece A, as shown in FIG. 2 and also in FIGS. 3, 4 and 5, has existing holes H. Workpieces A and B are placed together in abutting relationship and are secured in this manner during the hole center locating and marking step as hereinafter described.

Figure 4:
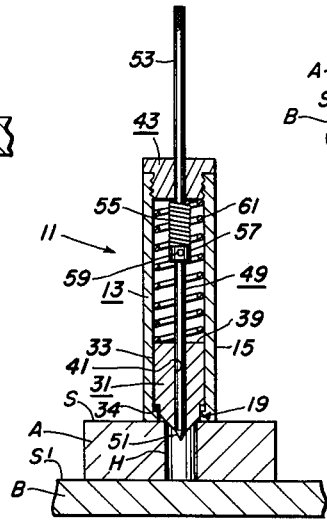
FIG. 4 is a view similar to FIG. 3 and illustrates the device in a centered position with the marking plunger retracted.
Figure 5:
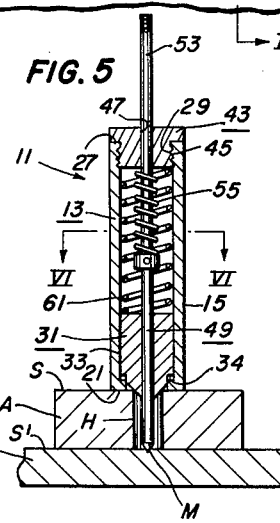
FIG. 5 is a view similar to FIGS. 3 and 4 and illustrating the tool in a centered position with the plunger released and extended.
Figure 6:
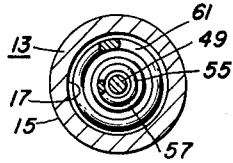
FIG. 6 is an enlarged cross-sectional view taken as on the line VI—VI of FIG. 5.

Tool 11 is operated and functions in the following manner: After positioning workpieces A and B as above described, conical end 37 of guide member 31 is inserted in hole H of workpiece A. This initial action, as shown in FIG. 3, shows the tool 11 off-center relative to hole H, but it will be understood that due to the conical surface 37, further downward movement of the tool from the position shown will cause the conical surface to slide downward into the hole until it reaches its maximum depth therein, where it will be exactly centered. After conical end 37 reaches the maximum depth, as is determined by the size of the hole, further pressure applied to body 13 causes spring 61 to be compressed until end face 21 abuttingly engages the top surface S of workpiece A, as shown in FIGS. 4 and 5. It will readily be seen that should tool 11 be canted as it enters hole H, it will be righted to a perpendicular position relative to surface S as further pressure is applied toward hole H and as surface S and face 21 abuttingly engage.

As tool 11 is held in the above described manner, the marking or center punching of surface S' of workpiece B can then be accomplished. This is done by grasping and retractively drawing plunger 49 rearwardly from tubular body 13, as shown in FIG. 4, and then releasing the plunger, thereby allowing spring 55 to impel plunger 49 toward the surface S' of workpiece B, thus causing conical point 51 to indent surface S' to form punch mark M.

The marking of workpiece B in the above described manner is particularly useful when the material is of plastic or of relatively soft metal, or when it is desired that the punch mark M should be small. However, if more forceful or heavier marking is required, or if the surface of the material is relatively hard, the distal end 53 of tool 11 can be struck with a hammer to bring about the required effectual marking of the material.

From the foregoing description, it is apparent that tool 11 of the present invention is a very handy and useful device, whereby hole centers can be located and marked quickly and easily. Furthermore, the optionally operated plunger 49 of tool 11 and the conical end 37 comprehensively increase the scope of the present invention and make it particularly suitable for use in a wide range of hole center locating and marking applications.

Although the invention has been described and illustrated with respect to a preferred embodiment thereof, it is to be understood that it is not to be so limited since changes and modifications may be made therein which are within the full intended scope of this invention as hereinafter claimed.

I claim:

1. A tool for locating and marking the center of a hole to be drilled and the like comprising a tubular body having an inwardly projecting flanged portion at one end and an internally threaded aperture at the opposite end, a cylindrical guide member slidably received in said tubular body abutting said flanged portion with said cylindrical guide member having a substantially conical end outwardly disposed relative to said tubular body and with said guide member having a longitudinally aligned and centrally located opening extending therethrough, said body including a cylindrical end piece having external threads at one end and having a longitudinally aligned and centrally located opening extending therethrough corresponding with said opening in said guide member and threadedly engaging said internally threaded aperture in said tubular body, a compression spring longitudinally disposed in said tubular body interposed between said cylindrical guide member and said end piece and yieldingly urging said cylindrical guide member abuttingly against said flanged portion of said tubular body, an elongated plunger having a sharply pointed end slidably received in and co-axially extending through said opening in said guide member and said opening in said end piece with said sharply pointed end disposed adjacent said conical end of said guide member, and resilient means attached to said plunger and reacting between said body and said plunger for actuating said plunger outwardly from said guide member.

2. A tool for locating and marking the center for a circular hole and the like comprising a tubular body having an inwardly projecting flanged portion at one end thereof and an internally threaded aperture at the opposite end, a cylindrical guide member slidably received in said tubular body abutting said flanged portion with said cylindrical guide member having a substantially conical end outwardly disposed relative to said tubular body and with said guide member having a longitudinally aligned and centrally located opening extending therethrough, said body including a cylindrical end piece having external threads at one end thereof and having a longitudinally aligned and centrally located opening extending therethrough corresponding with said opening in said guide member and threadedly engaging said internally threaded aperture in said tubular body, a first compression spring longitudinally disposed in said tubular body interposed between said cylindrical guide member and said end piece and yieldably urging said cylindrical guide member abuttingly against said flanged portion of said tubular body, an elongated plunger having a sharply pointed end slidably received in and co-axially extending through said opening in said guide member and said opening in said end piece with said sharply pointed end disposed adjacent said conical end of said guide member, a second compression spring concentrically carried on said plunger forwardly disposed of and contiguous to said end piece, and a collar mounted on said plunger abuttingly engaging said second spring, rearward movement of said plunger being effective to compress said second compression spring between said body and said collar whereupon release of said plunger causes said second compression spring to urge said plunger forwardly from said guide member.

3. A hole center locating and marking tool or the like as defined in claim 2 including means for selectively positioning said collar along said plunger to adjustably control the outward movement of said plunger from said guide member.

4. A hole center locating and marking tool or the like as defined in claim 2 including an adjustment screw threadedly fitted in said collar perpendicular to said plunger for the selective positioning of said collar along said plunger.

5. A tool for locating and marking the center for a circular hole and the like comprising a hollow body having an inwardly projecting flanged portion at one end thereof defining an open end of said body, a guide member slidably received in said body abutting said flanged portion and including a substantially conical end extending outwardly through said open end of said body, said body and said guide member being provided with aligned openings, a first compression spring interposed between said guide member and said body and yieldingly urging said guide member against said flanged portion, an elongated pointed plunger slidably received in said openings in said body and said guide member, a collar mounted on said plunger in said body, a second compression spring carried on said plunger with said plunger extending therethrough, said second compression spring having a forward end adjacent said collar and having a rearward end remote from said collar, said plunger being movable rearwardly to compress said second compression spring between said body and said collar whereupon release of said plunger causes said second compression spring to urge said plunger forwardly from said guide member.

6. A tool for locating and marking the center for a circular hole and the like comprising a hollow body having an inwardly projecting flanged portion at one end thereof defining an open end of said body, a guide member slidably received in said body abutting said flanged portion and including a substantially conical end extending outwardly through said open end of said body, said body and said guide member being provided with aligned openings, a first compression spring interposed between said guide member and said body and yieldingly urging said guide member against said flanged portion, an elongated pointed plunger slidably received in said openings in said body and said guide member, a collar mounted on said plunger in said body, a second compression spring carried on said plunger with said plunger extending therethrough, said second compression spring having a forward end adjacent said collar and having a rearward end remote from said collar, said rearward end of said second compression spring being normally spaced from said body and said collar being normally spaced from said guide member whereby said plunger is freely movable between limits without restraint, said plunger being movable rearwardly for a substantial distance to carry said collar and said second compression spring rearwardly and cause said rearward end of said spring to contact said body, said plunger being further movable rearwardly after contact of said spring with said body to compress said second compression spring between said body and said collar whereupon release of said plunger causes said second compression spring to urge said plunger forwardly from said guide member.

References Cited in the file of this patent
UNITED STATES PATENTS

| | | |
|---|---|---|
| 1,233,458 | Fisk | July 17, 1917 |
| 2,164,825 | Lack | July 4, 1939 |
| 2,595,347 | Flemming | May 6, 1952 |
| 2,719,363 | Johnson | Oct. 4, 1955 |
| 2,981,006 | Keklikian | Apr. 25, 1961 |

OTHER REFERENCES

American Machinist, September 26, 1955, "Universal Copy Punch," page 158.